United States Patent
Valvanne et al.

(10) Patent No.: US 9,426,234 B2
(45) Date of Patent: *Aug. 23, 2016

(54) METHOD FOR PROVIDING A THIRD PARTY SERVICE ASSOCIATED WITH A NETWORK ACCESSIBLE SITE

(71) Applicant: Nosto Solutions Ltd, Helsinki (FI)

(72) Inventors: Juha Niilo Sakari Valvanne, Helsinki (FI); Antti Aleksanteri Pöyhönen, Vantaa (FI); Jani Markus Luostarinen, Helsinki (FI)

(73) Assignee: NOSTO SOLUTIONS LTD, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/621,518

(22) Filed: Feb. 13, 2015

(65) Prior Publication Data

US 2015/0189015 A1 Jul. 2, 2015

Related U.S. Application Data

(63) Continuation-in-part of application No. 14/255,733, filed on Apr. 17, 2014.

(60) Provisional application No. 61/866,559, filed on Aug. 16, 2013.

(51) Int. Cl.
    *H04L 12/66* (2006.01)
    *H04L 29/08* (2006.01)
    *H04L 12/24* (2006.01)

(52) U.S. Cl.
    CPC ............ *H04L 67/20* (2013.01); *H04L 41/5064* (2013.01); *H04L 67/02* (2013.01); *H04L 67/22* (2013.01)

(58) Field of Classification Search
    CPC .............................. H04L 12/24; H04L 67/22
    See application file for complete search history.

(56) References Cited

U.S. PATENT DOCUMENTS

2006/0167860 A1* 7/2006 Eliashberg ............ G06Q 30/06
2006/0253578 A1* 11/2006 Dixon .................... G06Q 10/06
                                                            709/225

(Continued)

FOREIGN PATENT DOCUMENTS

WO         2009009257          1/2009

*Primary Examiner* — Nicholas Taylor
*Assistant Examiner* — Sanjoy Roy
(74) *Attorney, Agent, or Firm* — Fasth Law Offices; Rolf Fasth

(57) ABSTRACT

The method is for providing a third party service associated with a network-accessible site. A client-side script is provided that is configured to be installed on a client-side application. The client-side script is configured to gather information associated with the network-accessible site in response to access of the network-accessible site via the client-side application. The information associated with the network-accessible site has a user identifier and content published on the network-accessible site and user behavior data associated with access of the network-accessible site. The information associated with the network-accessible site is gathered via the client-side script in response to access of the network-accessible site via the client-side application. The content information associated with the network-accessible site is stored in the form of site records in a database. The client script is further configured to report gathered information by executing the script.

12 Claims, 5 Drawing Sheets

(56) References Cited

U.S. PATENT DOCUMENTS

| | | | |
|---|---|---|---|
| 2008/0288303 A1* | 11/2008 | Gray | G06Q 30/0185 705/7.29 |
| 2009/0017805 A1* | 1/2009 | Sarukkai | H04W 28/06 455/414.3 |
| 2009/0216882 A1 | 8/2009 | Britton et al. | |
| 2009/0292984 A1* | 11/2009 | Bauchot | G06F 17/30896 715/234 |
| 2010/0070448 A1* | 3/2010 | Omoigui | H01L 27/1463 706/47 |
| 2010/0070962 A1* | 3/2010 | Sinn | G06F 8/65 717/171 |
| 2013/0304906 A1* | 11/2013 | Yavilevich | H04L 67/22 709/224 |

* cited by examiner

METHOD FOR PROVIDING A THIRD PARTY SERVICE ASSOCIATED WITH A NETWORK ACCESSIBLE SITE

PRIOR APPLICATIONS

This is a continuation-in-part application of U.S. patent application Ser. No. 14/255,733, filed 17 Apr. 2014 that claims priority from U.S. provisional patent application Ser. No. 61/866,559, filed 16 Aug. 2013.

FIELD OF THE INVENTION

The invention generally relates to sharing information related to network-accessible sites with third party service providers. More specifically, the invention relates to computer implemented services for providing a third party service associated with a network-accessible site.

BACKGROUND OF THE INVENTION

Currently, many network-accessible sites such as web sites utilize third party services to add functionalities to web sites. The functionalities added to the web sites can be web site analytics, discussion boards and social media plug-ins.

Third party scripts are generally included into HyperText Markup Language (HTML) codes of a web site for providing the third party services on the web site. The third party scripts capture user behavior data to provide behavior-driven information such as product recommendations to users. However, the third party scripts may not capture details associated with the content published on the web site. Without knowledge of the content published on the web site, the third party service provider may not be able to provide appropriate recommendations to the users.

There are some systems where the third party service provider can be reported with the content published on the web site and the user behavior data to generate appropriate recommendations on the web site. However, currently, an owner of the web site needs to implement two different interfaces, namely, a scripting interface and a data exchange interface. The scripting interface is required to capture the user behavior data from the web site. The data exchange interface is required to transfer the content published on the web site to the third party service provider. Generally, a back-end integration approach implements a direct integration between the web site and the third party service provider. Typically, a batch job is executed periodically to send the web site information to the third party service provider using a protocol such as a File Transfer Protocol (FTP). Thus, the owner of the web site is required to actively send the web site information to the third party service provider. Due to the back-end integration, the third party service provider may not receive real-time data between periodically executed integration. Additionally, the implementation of a system with the back-end integration is time consuming and expensive.

Therefore, there is a need for an improved method and system for gathering information about a network-accessible site and users of the network-accessible site.

SUMMARY OF THE INVENTION

The method of the invention for providing a third party service associated with a network-accessible site comprises providing a client-side script configured to be installed on a client-side application, wherein the client-side script is configured to gather information associated with the network-accessible site in response to access of the network-accessible site via the client-side application, wherein the information associated with the network-accessible site comprises: a user identifier, content published on the network-accessible site; and user behavior data associated with access of the network-accessible site; gathering the information associated with the network-accessible site via the client-side script in response to access of the network-accessible site via the client-side application; storing the content information associated with the network-accessible site in the form of site records in a database, and providing the third-party service based on the information gathered via the client-side script, the client script being further configured to report gathered information by executing the script.

The system of the invention for providing a third party service comprises a client-side script configured to be installed on a client side application; wherein the client-side script is configured to gather the information associated with the network-accessible site in response to access of the network-accessible site via the client-side application; wherein the information associated with the network-accessible site comprises: a user identifier, content published on the network-accessible site; and user behavior data associated with access of the network-accessible site; and a server configured to receive the information associated with the network-accessible site from the client-side script, wherein the server is configured to provide the third party service based on the information received from the client-side script, and wherein the server is connected to a database storing the content associated with the network-accessible site in the form of site records.

The invention enables forwarding information about a network-accessible site and users of the network-accessible site also to other service providers requiring this information and which the network accessible site owner wants to use. Sharing the information enables supporting multitude of services through a single scripting approach.

In an earlier application of the applicant, U.S. Ser. No. 14/255,733, filed on Apr. 17, 2014, it was described how replica of records were built from a site and how the user behavior from a site was captured. Personalized end content was published for clients using this information.

There is, however, a need for producing new kind of information for sites that construct the end content by themselves of different reasons, such as security requirements, or for the sake of keeping their own control in the production of the content itself.

The information in the sites from which the replica of records are built is changing and therefore the replica of records need to be updated preferably as soon as changes occur.

Instead of publishing end content, for clients of the type of sites that construct their end content by themselves, the solution of this invention keeps the replica of records up-to-date and reports the information in the form of the stored site records and user behavior data. The replica can be reported and kept up-to-date for multiple other parties, too, in addition to the third party server, and instead of publishing end user content directly for each person/server, this invention provides a solution for sending suggested records' identifiers to the clients of the sites.

The site records can have e.g. lists of the site's products and services and the status of those. When replica of site records are reported to the third party server and other parties, the information is associated with user references and/or identifiers as well as user behavior in the messages. All information might even be formalized in some way by the third party service.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

DETAILED DESCRIPTION OF THE INVENTION

Figure 1:
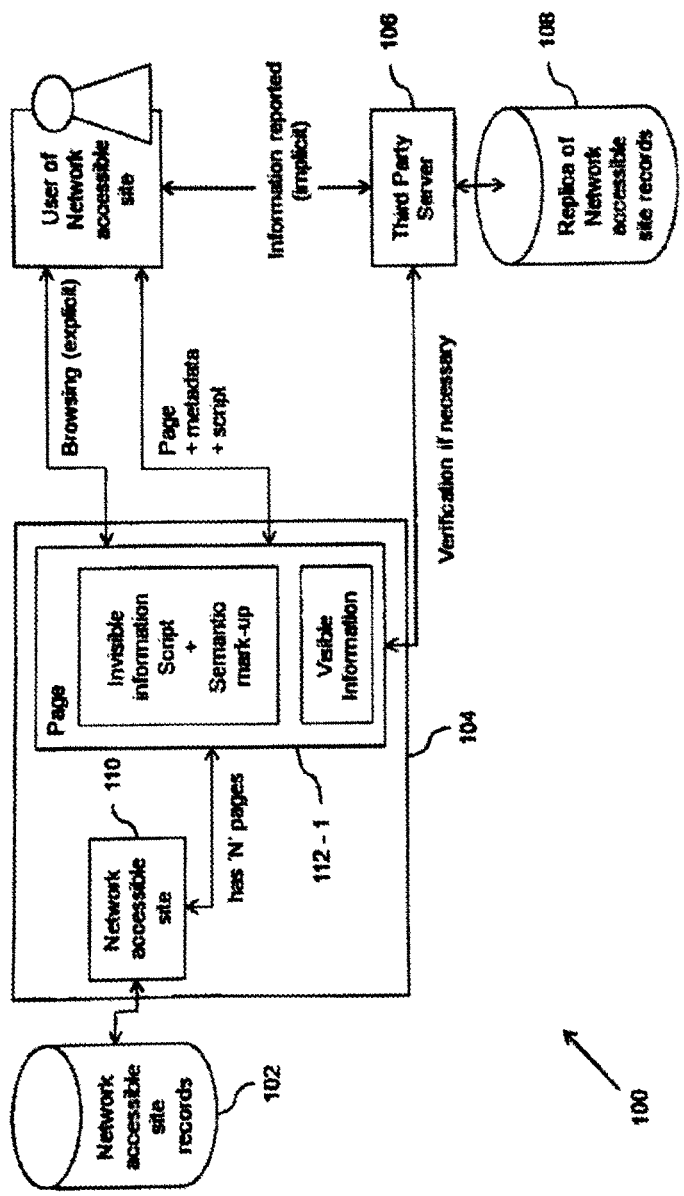
FIG. 1 illustrates a block diagram of a system for providing a third party service associated with a network-accessible site in accordance with various embodiments of the invention.

Before describing in detail embodiments that are in accordance with the invention, it should be observed that the embodiments reside primarily in combinations of method steps and system components for providing a third party service associated with a network-accessible site using a single scripting approach. Accordingly, the method steps and system components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, the terms "comprises," "comprising," or any other variation thereof, are intended to cover a non-exclusive inclusion, such that a process, method, article, or apparatus that comprises a list of objects does not include only those objects but may include other objects not expressly listed or inherent to such process, method, article, or apparatus. An object proceeded by "comprises . . . a" does not, without more constraints, preclude the existence of additional identical objects in the process, method, article, or apparatus that comprises the object.

Various embodiments of the invention provide a method for providing a third party service associated with a network-accessible site. The method includes automatically transferring information associated with a network-accessible site using a single scripting approach to a third party service provider. In accordance with the various embodiments, the term "network-accessible site" refers to a site which is accessible via a network through addresses known as Uniform Resource locators (URL). The network can be one of, but not limited to, Internet, intranet, Local Area Network (LAN), Wireless Local Area Network (WLAN), Wireless Wide Area Network (WWAN), Wireless Metropolitan Area Network (WMAN), Wide Area Network (WAN) and telecommunication network. The network-accessible site can be accessed using a client device such as, but not limited to, computers, laptops, phones, tablets, handheld devices, television, portal digital devices and other media accessible devices.

In accordance with the various embodiments, the method includes providing a client-side script which is configured to be installed on a client-side application. The client-side script can be a script such as, but not limited to, a JavaScript®, a Visual Basic script (VBScript®), Ecmascript®, Dart®, Flash®, Silverlight®, Native Client modules, Java® and script of any other language which can be implemented on the client-side application to achieve the desired objective. Further, the client-side script can be implemented as a plug-in which can be installed in the client-side application. The client side application can be an application such as, but not limited to, a browser and a mobile phone application.

In accordance with the various embodiments, the client-side script gathers information associated with the network-accessible site in response to access of the network-accessible site via the client-side application. The information associated with the network-accessible site includes content published on the network-accessible site and user behavior data associated with access of the network-accessible site. The information is gathered in response to access of the network-accessible site via the client-side application. Based on the information gathered using the client-side script, the third party service provider can provide users with one or more services such as, but not limited to, recommendations, advertisements, product related information, discount offers and coupons.

Referring to the figures and in particular FIG. 1, wherein a block diagram of a system 100 for providing a third party service associated with a network-accessible site is illustrated in accordance with various embodiments of the invention. As illustrated, system 100 includes a record database such as a network-accessible site records database 102, a client-side application 104, a third party server 106 and a third party database 108.

Network-accessible site records database 102 is configured to store network-accessible site information of one or more network-accessible sites. The network-accessible site information includes information such as, but not limited to, content published on the network-accessible site, information about different pages of the network-accessible site and URL of the network-accessible site. The published content can be one or more of, but not limited to, text, image, video or other media content.

As illustrated, client-side application 104 is configured to allow access to one or more network-accessible sites such as a network-accessible site 110. Client-side application 104 can be a browser including the client-side script (not illustrated in FIG. 1). The client-side script is configured to be installed on client side application 104. The client-side script can be a browser plug-in, which can be installed on client-side application 104. The client-side script is configured to gather information associated with the one or more network-accessible sites. The information associated with the one or more network-accessible sites includes the network-accessible information and user behavior data. The user behavior data can include one or more of, but not limited to, keywords used for searching, products viewed, products added in a shopping cart and products purchased. The client-side script is configured to gather the information associated with the one or more network-accessible sites when a user accesses the one or more network-accessible sites. The client-side script transfers the gathered information to third party server 106.

The one or more network-accessible sites such as network-accessible site 110 are configured to allow users to browse through the published content using client-side application 104. As illustrated, network-accessible site 110 can include one or more pages such as 112-1. Each page such as 112-1 as shown in FIG. 1, of the one or more pages can include an invisible information script and visible information. The invisible information scripts can include semantically marked parts of the published content. The semantic markup presents structured records without affecting visual representation of network-accessible site 110 and pages 112-n. The semantic mark-up of the published content enables the client-side script to transfer structured information to third party server 106. For example, the information sent to third party server 106 can be one or more of, but not limited to, product items, purchase orders and articles. In an embodiment, the one or more pages include only the visible information. In accordance with the embodiment, the client-side script gathers the visible information and transfers the visible information to third party server 106.

Third party server 106 is configured to provide content and behavior based services to users based on information collected from the users. Third party server 106 is configured to receive information associated with the one or more network-accessible sites from the client-side script. Third party server 106 is configured to provide appropriate services to a user based on information received from client-side script. The appropriate services can be related to providing one or more of, but not limited to, behavior driven information, recommendations, advertisements, offers and any other third party services to the user.

There can be a plurality of instances of client-side application 104 on a plurality of client devices. The plurality of instances can transfer information associated with a plurality of network-accessible sites. The transferred information can include information associated with content published on the plurality of network-accessible sites and user behavior data of a plurality of users associated with the plurality of network-accessible sites. Third party server 106 can accordingly be configured to receive the information associated with the plurality of network-accessible sites for providing appropriate services to one or more of the plurality of users.

Third party server 106 is also configured to verify the accuracy of information received from a user of client-side application 104. Third party sever 106 can include an anti-fraud module (not illustrated in FIG. 1) to prevent third party server 106 from receiving false information such as the information received from malicious users. The anti-fraud module can be configured to perform one or more functions such as, but not limited to, utilizing statistical methods to find correct information against the information gathered from multiple users, using past behavior of a user to rank trustworthiness of the user, verifying the content published on the one or more network-accessible sites by mimicking client-side application 104 to fetch the information from the one or more network-accessible sites using a crawler. For instance, if the anti-fraud module is configured to utilize the statistical methods for finding correct information, then the antifraud module compares different versions of information received by the one or more users and chooses the most popular version. Taking another instance, if the anti-fraud module is configured to monitor the rate and distribution of information over Internet Protocol (IP) addresses of users, and identifiers of browser, user-agent and cookies, then the anti-fraud module can identify non-human malicious events.

Third party database 108 is also configured to create and store a replica of the network-accessible site information. Third party database 108 is configured to store the replica of the network-accessible site information stored in network-accessible site records database 102. The network-accessible site information is present in the information transferred from the plurality of instances of client-side application 104 to third party server 106. Further, the data stored in third party database 108 is updated when third party server 106 receives information from the plurality of instances of client-side application 104. Third party database 108 is also updated when third party server 106 analyzes the received information, wherein the analysis can be performed during fraud detection. The data stored in third party database 108 is utilized by third party server 106 to provide the appropriate services to users.

Figure 2:
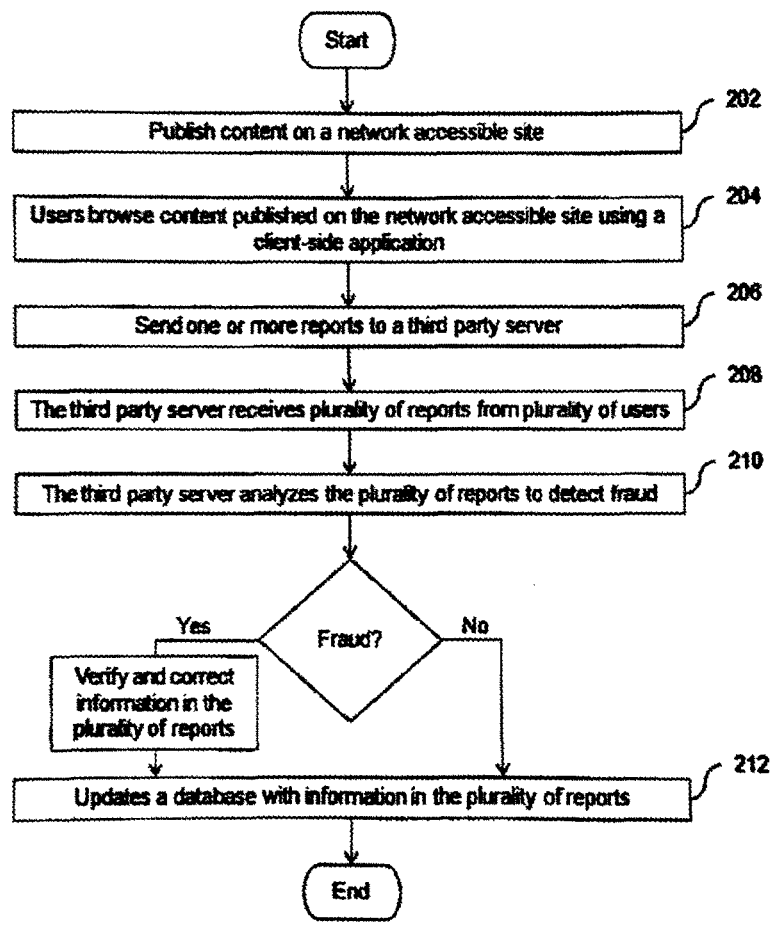
FIG. 2 illustrates a flowchart of a method for transferring network-accessible site and user behavior data using a single scripting approach in accordance with various embodiments of the invention.

FIG. 2 illustrates a flowchart of a method transferring network-accessible site and user behavior data using a single scripting approach in accordance with various embodiments of the invention.

At 202, a network-accessible site owner publishes information on a network-accessible site such as network-accessible site 110. The information can be text, image, video or other media content. At 204, a user browses the network-accessible site using a client-side application such as client-side application 104, wherein browsing includes performing one or more of, but not limited to, visiting, interacting and performing actions on the network-accessible site. When the user browses the network-accessible site, one or more reports are generated, wherein the one or more reports include information published on the network-accessible site and user behavior data. Thereafter, at 206, the one or more reports are automatically sent to a third party server such as third party server 106. The third party server can receive a plurality of reports corresponding to a plurality of users. At 208, the third party server receives the plurality of reports from the plurality of users. At 210, the third party server analyzes the plurality of reports to detect any fraud by identifying false information from malicious users. The third party server can detect fraud using the anti-fraud module. If there is no fraud, the third party server updates a database such as third party database 108 with the information in the plurality of reports at 212. If fraud is detected, the third party server verifies and corrects the information before updating the database.

Figure 3:
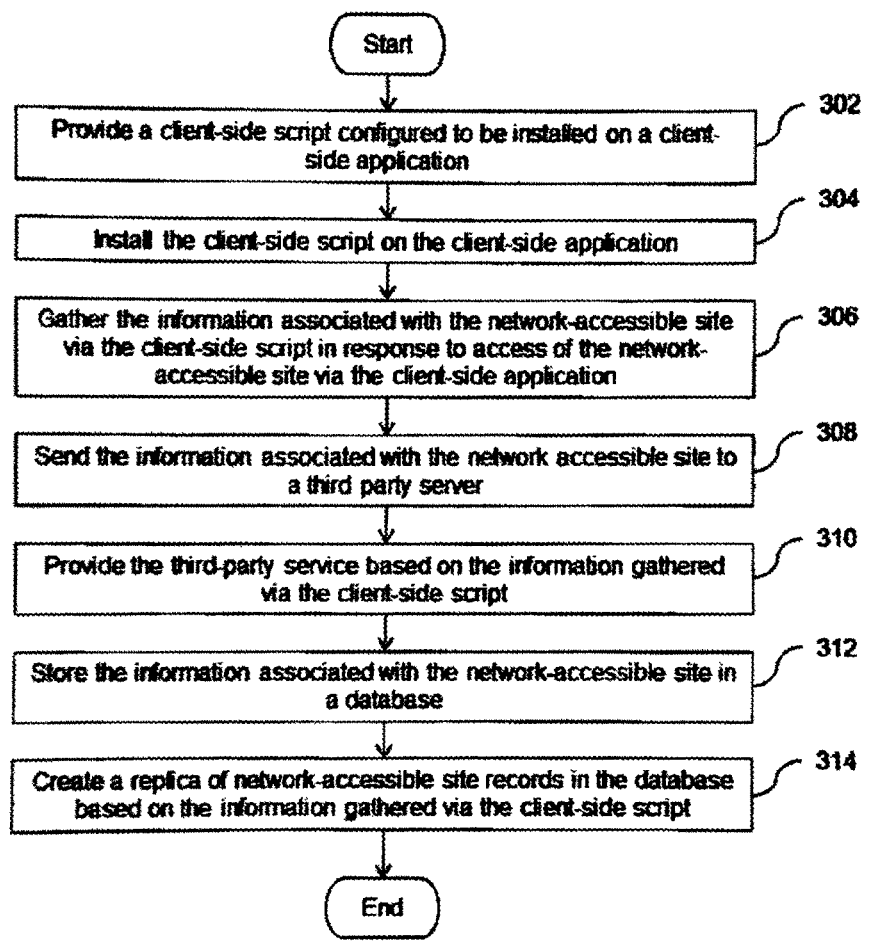
FIG. 3 illustrates a flowchart of a method for providing a third party service associated with a network-accessible site in accordance with various embodiments of the invention.

FIG. 3 illustrates a flowchart of a method for providing a third party service associated with a network-accessible site in accordance with various embodiments of the invention.

At 302, a client-side script is provided which is configured to be installed on a client-side application such as client-side application 104. In accordance with the various embodiments, the client-side script is configured to gather information associated with the network-accessible site in response to access of the network-accessible site via the client-side application. At 304, the client-side script is installed on the client-side application. At 306, the information associated with the network-accessible site is gathered via the client-side script in response to access of the network-accessible site via the client-side application. For example, when a user accesses a web site using a web browser, content such as text and image published on the website is gathered by the client-side script. At 308, the information associated with the network-accessible site is transferred to a third party server. At 310, the third-party service is provided to users based on the information gathered via the client-side script. At 312, the information associated with the network-accessible site is stored in a database such as third party database 108. At 314, a replica of network-accessible site records is created in the database based on the information gathered via the client-side script. The content published on the network-accessible site can include a structured data created using a semantic mark-up format. For example, products displayed on an e-store web site can be in a structured format and a semantic tag can be included for each product displayed on the e-store web site. In addition, the replica of the network-accessible site records can be updated when the content published on the network-accessible site is updated by an owner of the network-accessible site.

Figure 4:
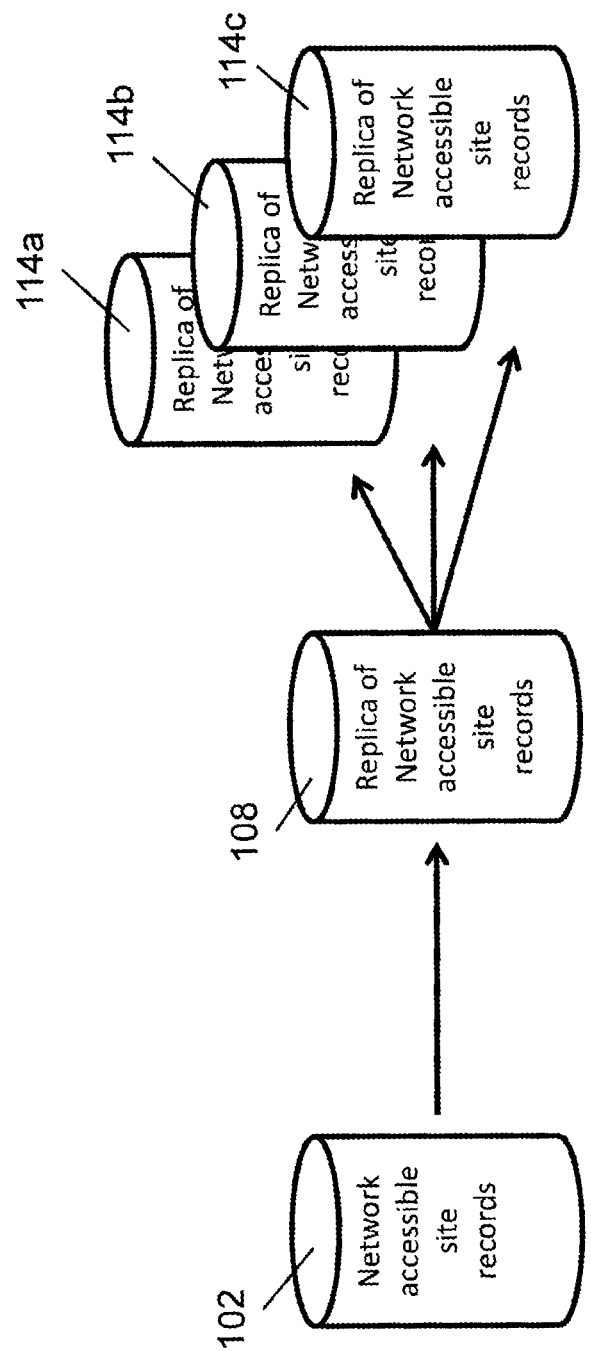
FIG. 4 illustrates an extension to the site records of FIG. 1 for sharing network-accessible site.

FIG. 1 describes how network-accessible site records (102) are transferred to the Third Party Server (106) which then creates a Replica of Network accessible site records (108). FIG. 4 adds a description how the network-accessible site records also can be forwarded to other service providers so that these service providers could share information of users' in order to create personalized content for users they have information about, i.e. information of the users' interests, shopping behavior, internet use etc. The personalized content is thus content that is affected by the behavior of the user in another service.

So that it would be possible for a service provider to make use of information of user behavior in another service provider's service, a user must be identified by means of e.g. a common user identifier by both service providers or by all service providers if several service providers are involved. Thereafter also user behavior data associated with this user identifier can be shared by the service providers.

FIG. 4 thus illustrates an extension to FIG. 1 for sharing network-accessible to other service providers using a single scripting approach. For sharing the network-accessible site records, the 3rd party server can send updates to other service providers either continuously as updates are done, or in batches where multiple records are updated during the process. For this purpose, the system 100 includes, in addition to the network-accessible site records database 102 and the third party database 108 with replica of network-accessible site records also additional databases 114a, 114b and 144c with replica of network-accessible site records held by such other service providers.

Figure 5:
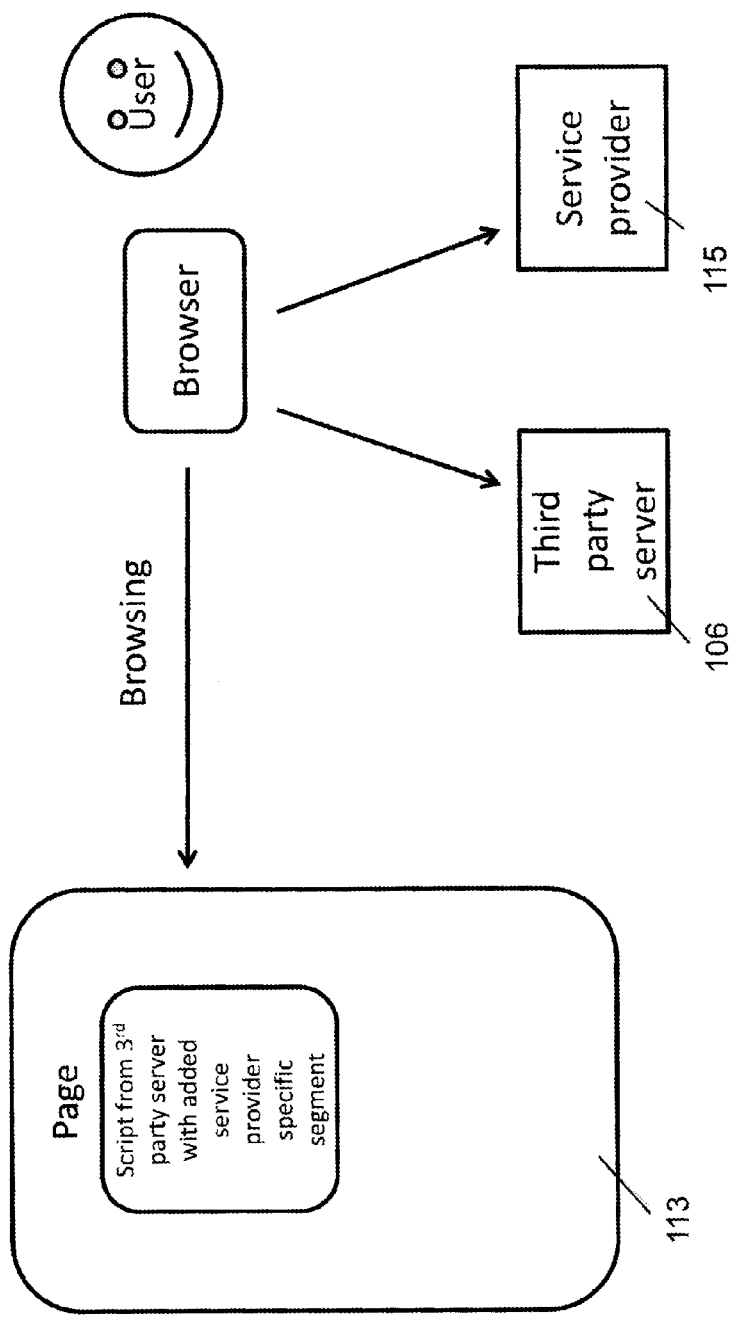
FIG. 5 illustrates an extension to the site script of FIG. 1 with added service provider specific segment for sharing network-accessible site and user behavior data Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

FIG. 5 describes how the client-side application reports information to the third party server 106 and to another service provider 115 while the user is browsing the network accessible site. The information is reported by executing the script created by the third party server in a page 113 of the network-accessible site 110. The reported information can be user references and/or user behavior.

FIG. 5 thus illustrates an extension to the site script of FIG. 1 in that page 13 has an added service provider specific segment for sharing network-accessible site and user behavior data (from users using services from the other service providers) by using a single scripting approach.

When a user's behavior in one service can be used to affect the content of a service from another service, these services need a way to identify the same user across the services. Sharing the identity information of the user of the network accessible site to other service providers can be automated by the third party server using the single scripting approach. Identifying the user can be done by adding new service provider specific segments to the client-side script executed by the client-side application. These segments are executed by the client-side application which has access to user references used in both services and can thus send the other services user reference to the other service. Typically the segment transmits the service provider's user reference to the 3rd party server or the 3rd party server's user reference is sent to the service provider.

Once the user references have been shared and the site records have been transferred, the 3rd party server can process the user's behavior and send the information that is useful for personalizing the experience for the user. This information can be the identifiers and site records that are associated to the user or could otherwise be of interest to the user.

In some circumstances it can be also desired to send the user's behavior on the network accessible site directly to the service provider in addition to the 3rd party server. Some typical reasons for this is that it enables the service provider to better personalize their service to the user or it enables the service provider to more accurately report how the service provider is creating value to the network accessible site owner, for example the performance of on-line advertisements.

Sending the user's behavior information on the network accessible site directly to the service provider can be automated by the third party server using the single scripting approach. Sending user's behavior information to the service provider can be done by adding new service provider specific segments to the client-side script executed by the client-side application.

These segments can be produced by the 3rd party server automatically and sent to the client-side application, which then executes them and sends the behavior information to the service provider.

The disclosed method transfers information associated with a network-accessible site to a third party service provider using a single scripting approach. Thus, the disclosed method eliminates the requirement of a back-end integration between the network-accessible site and the third party service provider, thereby reducing costs and implementation time and enabling faster update of information to a third party service provider. Due to the single scripting approach, the information in a third party database is updated in near real-time. The combination of the active reporting of information from the network-accessible site, semantic marking of published content on the network-accessible site and the anti-fraud module provide the third party service a near real-time and accurate view of the content published on the network-accessible site. The third party service provider can reuse the network-accessible site information and the user behavior data stored in the third party database to provide various services to users such as, but not limited to, advertisements, rendering product related information and discount offers.

Those skilled in the art will realize that the above-recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for providing a third party service associated with a network-accessible site, the method comprising:
   providing a client-side application in communication with a third party server that is in communication with a third party database;
   installing a client-side script on the client-side application, the client-side script gathering information associated with a network-accessible site in response to access of the network-accessible site via the client-side application,
   the gathered information associated with the network-accessible site:
      a user identifier,
      structured content published on the network-accessible site in accordance with a semantic mark-up format; and
      user behavior data associated with access of the network-accessible site;
   the client-side script transferring the gathered information to a third party server;
   the third party server storing the gathered information, received from the client-side script, in a form of site records in a database,
   the third party server providing a third-party service to the client-side application based on the gathered information,
   creating a replica of the structured content in the database based on the gathered information via the client-side script;
   dynamically updating the replica of the structured content based on updated information associated with the network-accessible site and gathered via the client-side script;
   the client-side script reporting the gathered information by executing a script to one or more additional service providers; and
   creating a personalized content for identified users to one or more additional service providers, wherein the personalized content, with which the network-accessible site is updated, is affected by a behavior of a user in a service provided by another service provider that shared the gathered information.

2. The method of claim 1 wherein the method further comprises sharing the network-accessible site, user identifier and behavior data stored by the third party server and the one or more additional service providers.

3. The method of claim 1 wherein the method further comprises creating personalized content for identified users based on the gathered information reported by the client-side script.

4. The method of claim 1 wherein the method further comprises verifying accuracy of the gathered information, wherein the verification is performed based on at least one of:
   accessing the network-accessible site from a server application;
   comparing information gathered from a plurality of client-side applications; and
   user behavior data gathered via the client-side script.

5. The method of claim 1, wherein the client-side script is one of a JavaScript, a Visual Basic script (VBScript), Ecmascript, Dart, Flash, Silverlight, Native Client modules and Java.

6. The method of claim 1, wherein the client-side application is a browser.

7. The method of claim 1, wherein the client-side application is a mobile phone application.

8. A system for providing a third party service, the system comprising:
   a network-accessible site having a page, the page comprising visible information containing a structured content being visible on the network-accessible site and invisible information being invisible on the network-accessible site, the invisible information comprising user-behavior data and a semantic mark-up of the structured content;
   a client-side script be installed on a client-side application;
   the client-side script being in communication with a network-accessible site to gather information associated with the network-accessible site in response to access of the network-accessible site via the client-side application;
   the gathered information gathered by the client-side script:
      a user identifier,
      content published on the network-accessible site; and
      user behavior data associated with access of the network-accessible site; and
   a server in communication with the client-ide script to receive the gathered information associated with the network-accessible site from the client-side script, the server being in communication with the client-side application to provide a third party service based on the gathered information received from the client-side script, the server being connected to a database to store the structured content in a form of site records the database comprising the user behavior data and a replica of the structured content published on the network-accessible site; and
   the server dynamically updating the replica of the structured content based on updated information gathered by the client-side script; the server creating a personalized content for identified users to one or more additional service providers, wherein the personalized content, with which the network-accessible site is updated, is affected by a behavior of a user in a service provided by another service provider that shared the gathered information.

9. The system of claim 8, wherein the server further comprises an anti-fraud module verifying the gathered information received from the client-side script.

10. The system of claim 8, wherein additional service providers are in communication with the client-side script to receive the gathered information associated with the network-accessible site from the client-side script that has a service provider specific segment for sharing network-accessible site and user behavior data from identified users.

11. The system of claim 10, wherein the user identifier is associated with the shared information of the network-accessible site data and behavior of a given user for the identification of the user.

12. The system of claim 10, wherein an identified user is a user that is provided with personalized content affected by a behavior in other services provided by the service provider and/or additional service providers.

* * * * *